US010610900B2

(12) United States Patent
Blackman

(10) Patent No.: US 10,610,900 B2
(45) Date of Patent: Apr. 7, 2020

(54) APPARATUS AND SYSTEM FOR CLEANING PAINT MASKING DEVICES

(71) Applicant: J Squared Innovationz, LLC, Allendale, MI (US)

(72) Inventor: Jerime Blackman, Allendale, MI (US)

(73) Assignee: J Squared Innovationz, LLC, Allendale, MI (US)

( * ) Notice: Subject to any disclaimer, the term of this patent is extended or adjusted under 35 U.S.C. 154(b) by 33 days.

(21) Appl. No.: 15/841,476

(22) Filed: Dec. 14, 2017

(65) Prior Publication Data

US 2018/0161824 A1 Jun. 14, 2018

Related U.S. Application Data

(60) Provisional application No. 62/434,127, filed on Dec. 14, 2016.

(51) Int. Cl.
| | |
|---|---|
| *B08B 3/02* | (2006.01) |
| *B05B 13/02* | (2006.01) |
| *B08B 3/14* | (2006.01) |
| *B08B 3/04* | (2006.01) |
| *B05B 16/00* | (2018.01) |
| *B05B 14/40* | (2018.01) |

(Continued)

(52) U.S. Cl.
CPC .......... *B08B 3/022* (2013.01); *B05B 13/0242* (2013.01); *B05B 14/40* (2018.02); *B05B 15/555* (2018.02); *B05B 16/95* (2018.02); *B08B 3/006* (2013.01); *B08B 3/041* (2013.01); *B08B 3/14* (2013.01); *B05B 12/26* (2018.02); *B08B 2203/0211* (2013.01); *B08B 2203/0223* (2013.01)

(58) Field of Classification Search
CPC ......... B08B 3/022; B08B 3/006; B08B 3/041; B08B 3/14; B08B 2203/0211; B08B 2203/0223; B05B 15/555; B05B 14/40; B05B 16/95; B05B 13/0242; B05B 12/26
USPC .......................................................... 134/98
See application file for complete search history.

(56) References Cited

U.S. PATENT DOCUMENTS 4,051,805 A * 10/1977 Waldrum ............ B05B 13/0242
118/58

OTHER PUBLICATIONS

Kramer Industries, Inc., Cleaning Paint Plugs, The Finished Part Blog, Jan. 4, 2012.

(Continued)

*Primary Examiner* — Michael E Barr
*Assistant Examiner* — Tinsae B Ayalew
(74) *Attorney, Agent, or Firm* — Gardner Linn

(57) ABSTRACT

A paint removal apparatus for cleaning paint from masking devices includes a support base having a plurality of engagement features that are each configured to securely engage at least one paint masking device. A spray nozzle is aimed in a fixed direction toward the support base and configured for spraying a pressurized stream of water at a desired velocity that removes paint from an exterior surface of at least one of the masking devices engaged at the support base. The support base is configured to successively move the masking devices engaged at the engagement features into the pressurized stream of water, such as to provide a generally continuous cleaning operation of masking devices. During movement or rotation of the support base, an exposed portion of the support base may extend from a spray enclosure for removing cleaned plugs from and loading painted plugs onto such an exposed portion.

20 Claims, 12 Drawing Sheets

(51) Int. Cl.
*B08B 3/00* (2006.01)
*B05B 15/555* (2018.01)
*B05B 12/26* (2018.01)

(56) References Cited

OTHER PUBLICATIONS

Kramer Industries, Inc., TB Series Tumble Blasters, Dec. 14, 2017.

\* cited by examiner

APPARATUS AND SYSTEM FOR CLEANING PAINT MASKING DEVICES

CROSS-REFERENCE TO RELATED APPLICATION

This application claims benefit and priority under 35 U.S.C. § 119(e) of U.S. provisional application Ser. No. 62/434,127, filed Dec. 14, 2016, which is hereby incorporated herein by reference in its entirety.

FIELD OF THE INVENTION

The present invention generally relates to an apparatus and system for cleaning paint from paint masking devices, and more particularly to automated machines and processes for cleaning powder coated paint from paint masking devices, such as silicon plugs, caps, or the like.

BACKGROUND OF THE INVENTION

During a powder coating process it is common to use paint masking devices, such as plugs or caps, to cover or conceal areas of an article to be painted, such as holes or apertures, where the plugs or caps may cover or conceal the area of the article during the coating and/or heating or baking steps of the powder coating process. These painting masking devices can accumulate paint, making future reuse of the paint masking devices difficult and in some cases unmanageable or undesirable. Various paint removal processes are known, such as chemical stripping and scrapping; however, these processes are not typically cost effective or automated in a way to remove powered coated paint residue from such paint masking devices.

SUMMARY OF THE PRESENT INVENTION

The present invention provides an apparatus and system for cleaning paint from masking devices, such as plugs and caps and the like, that have undergone a powder coating paint process, such that the masking devices can be reused in future paint processes. The paint removal apparatus sprays pressurized water, such as from one or more water spray nozzles, at the masking devices to remove the paint in a generally continuous and automated manner. The masking devices may be held during the spraying process by a support base, which may move and/or rotate to cause the pressurized stream or streams of water to contact the painted surfaces of the masking devices. An enclosure may also be provided around the water spray nozzle or nozzles and the masking devices being cleaned. After passing through the pressurized water, if all or substantially all the paint is cleaned off, the masking device may be removed from the support base and replaced with a paint-covered masking device for cleaning. Otherwise, if paint remains on the masking device, the masking device may remain on the support base and reenter the enclosure to be cleaned again. Sufficiently cleaned plugs may be held in a drying station after cleaning for residual water to evaporate or otherwise be removed and to allow for inspection before being reused in future paint masking applications.

According to one aspect of the present invention, a paint removal apparatus for cleaning paint from masking devices includes a support base having a plurality of engagement features that are each configured to securely engage at least one masking device. A spray nozzle is aimed in a fixed direction toward the support base and configured for spraying a pressurized stream of water at a desired velocity that removes paint from an exterior surface of at least one of the masking devices engaged at the support base. The support base is configured to successively move the masking devices engaged at the engagement features into the pressurized stream of water, such as to provide a generally continuous cleaning operation of masking devices.

According to another aspect of the present invention, a paint removal apparatus for cleaning paint from masking devices includes a support base having a plurality of engagement features that are each configured to securely engage at least one masking device. A spray nozzle is directed toward the support base and is configured for spraying a pressurized stream of water that removes paint from a masking plug engaged at the support base. A spray barrier may be disposed between the spray nozzle and a portion of the support base that is configured for loading painted masking devices onto at least one of the plurality of engagement features. The support base may be configured to continuously move, such as to rotate, for successively removing cleaned masking devices and loading painted masking devices onto a least one of the engagement features.

According to yet another aspect of the present invention, a method for cleaning paint from masking devices includes engaging a plurality of masking devices on a plurality of engagement features coupled with a support base that rotates at least partially within a spray enclosure. A pressurized stream of water is sprayed from a spray nozzle disposed in the spray enclosure and is directed toward at least one of the masking devices supported at the support base. The support base may be moved, such as being driven in rotation at a generally constant speed, to position at least one of the plurality of masking devices in the pressurized stream of water to remove paint from the corresponding masking device.

These and other objects, advantages, purposes, and features of the present invention will become apparent upon review of the following specification in conjunction with the drawings.

DETAILED DESCRIPTION OF EMBODIMENTS

Figure 1:
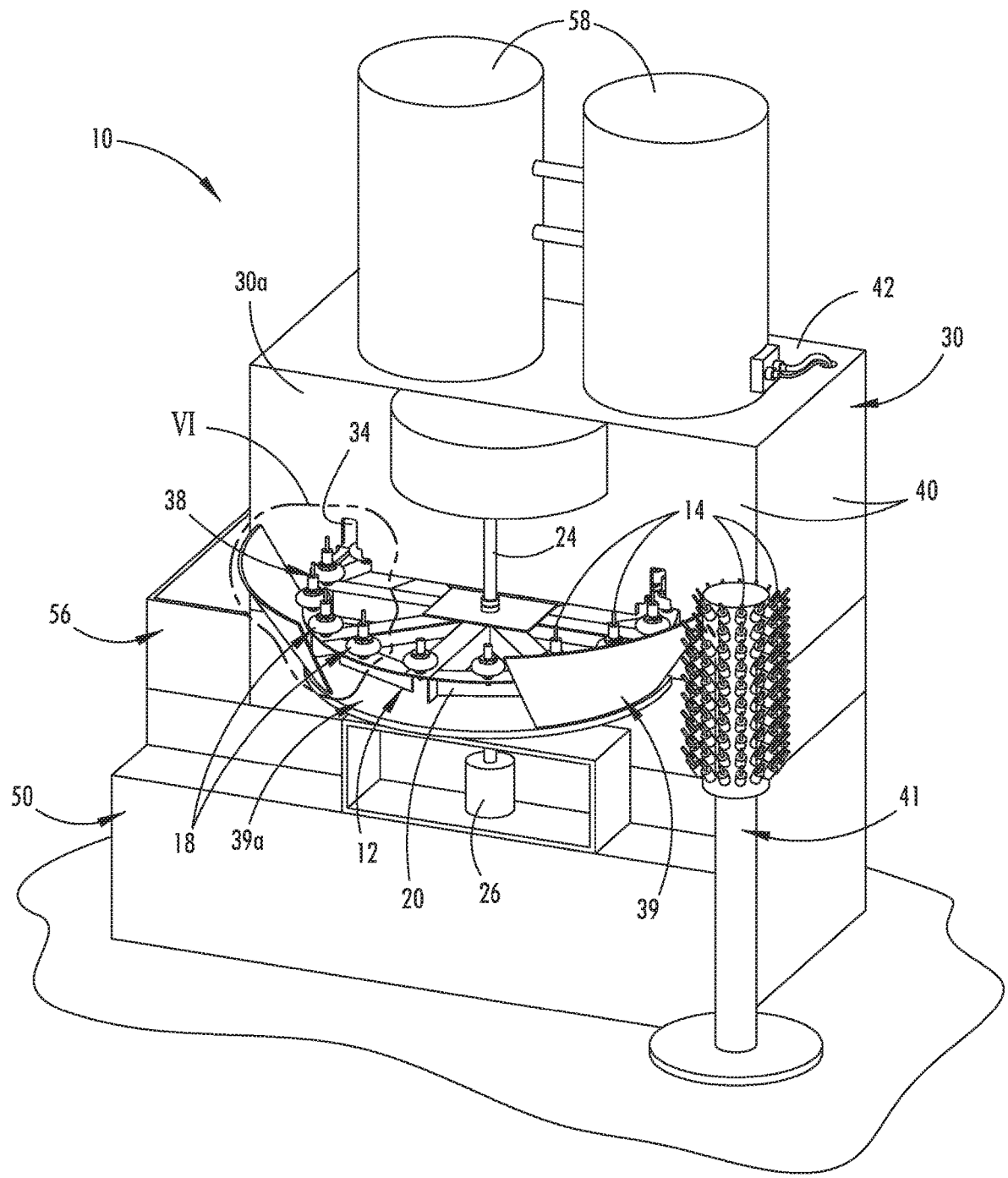
FIG. 1 is an upper perspective view of a paint removal apparatus for cleaning paint from masking devices in accordance with the present invention.

Referring now to the drawings and the illustrative embodiments depicted therein, a paint removal apparatus 10 (FIGS. 1-5A) is provided for cleaning adhered or cured powder coated paint from masking devices, such as plugs and caps and the like, so that the masking devices can be reused in future powder coating paint operations. The illustrated paint removal apparatus 10 includes a support base 12 for supporting a plurality of masking devices, such as the plugs 14 shown in FIG. 1. A pressurized stream of water is sprayed from one or more spray nozzles 16 and is directed toward the support base 12 to remove paint from the outer or exterior surfaces of at least one of the masking devices. The water spray nozzle or nozzle 16 may be fixed, such that the water stream 16a (FIG. 5) generated may be sprayed in a generally constant direction and velocity that is configured to contact the masking devices and remove the paint that is cured or adhered or otherwise disposed on the outer or exterior surfaces of the masking plugs 14. As the nozzle 16 is spraying the pressurized water stream 16a, the support base 12 is movable relative to the fixed nozzle 16, such as by rotation of the support base 12, to successively position each of masking devices to be cleaned in the path of the pressurized stream or streams of water. During movement of the support base 12, at least a portion of the support base 12 may be accessed for removing cleaned masking devices and loading paint-covered masking devices, so as to provide a general continuous and at least partially automated cleaning operation.

Figure 8:
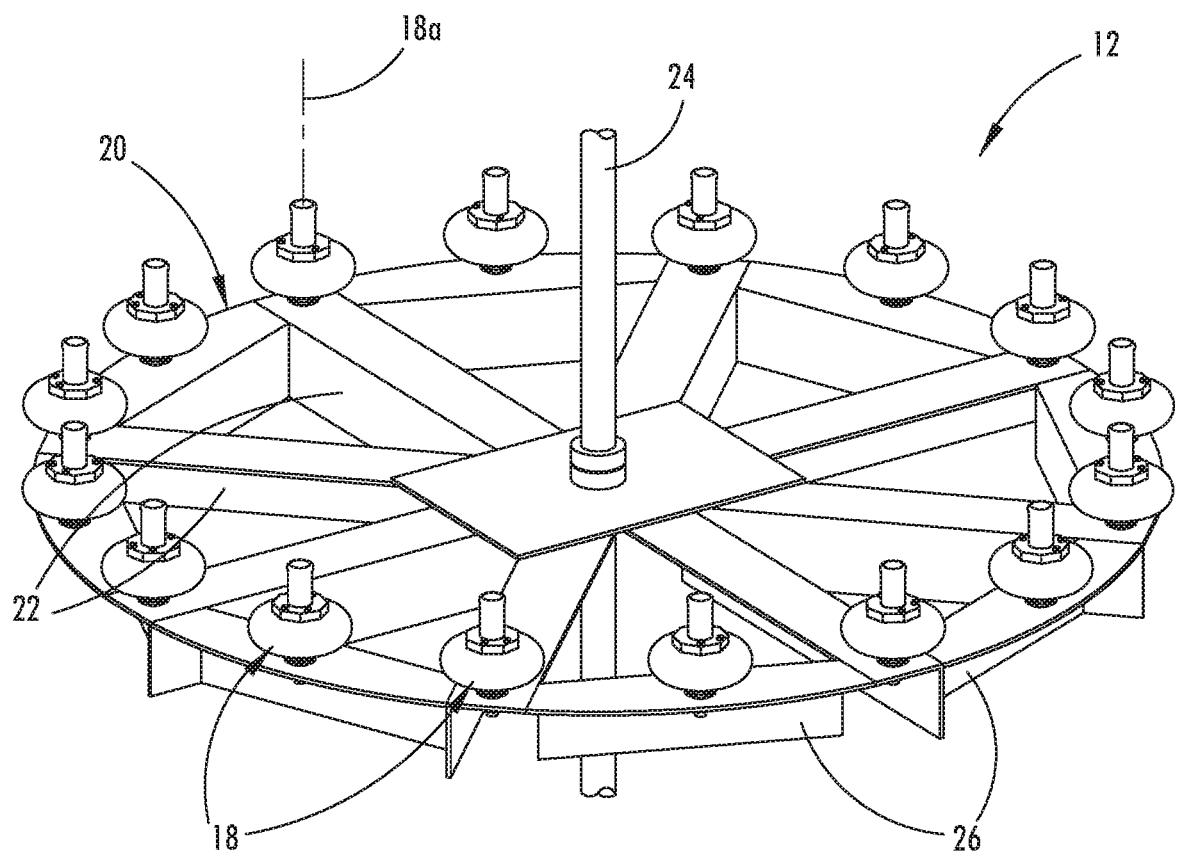
FIG. 8 is an upper perspective view of a frame of the support base.
Figure 9:
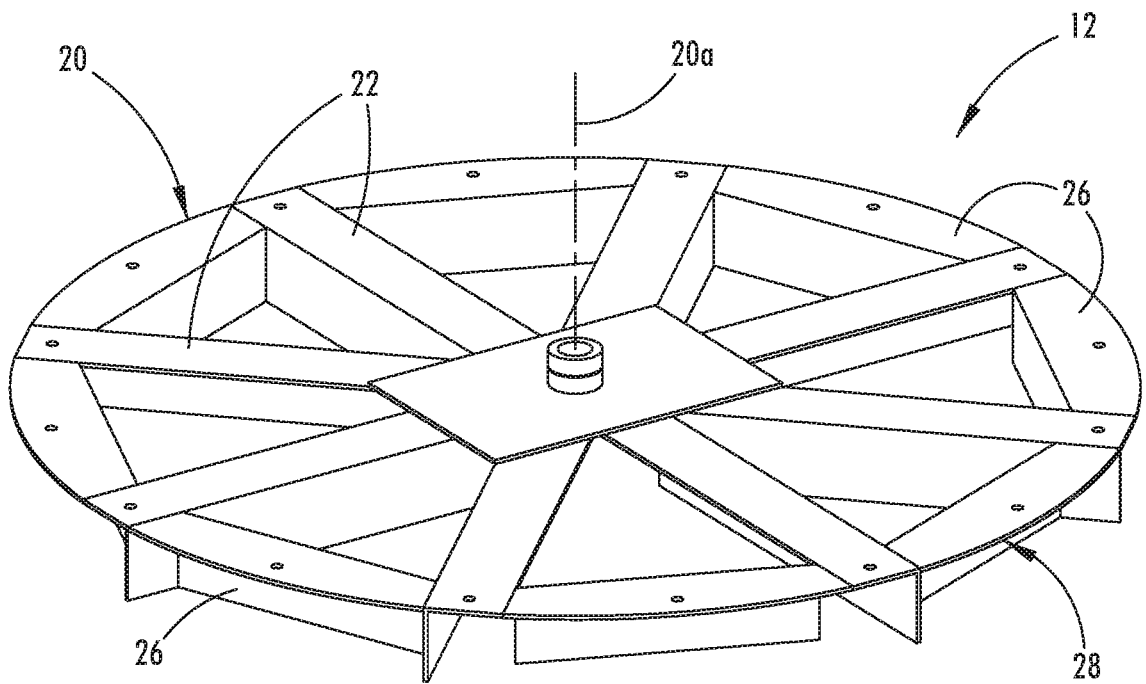
FIG. 9 is an upper perspective view of the frame shown in FIG. 8 having engagement features removed that support the individual masking plugs.

The support base 12 is loaded with masking devices 14 that are held and securely engaged at engagement features 18 disposed in a spaced arrangement at the support base 12. The support base may be a rigid frame (FIGS. 1-9), such as a wheel or turntable configuration; a conveyor system (FIG. 13), such as a belt or slatted track; a tumbling or agitation device, such as a drum or basket; or like structures. As shown in FIGS. 1-4, the support base 12 includes a rigid frame 20 that is configured to rotate relative to the spray nozzle 16 about a generally centrally located axis 20a (FIG. 9) of the rigid frame 20. The rigid frame 20 as shown in FIGS. 8 and 9 is shaped like a wheel or spoked carousel that has a plurality of spokes 22 attached to and extending radially from a drive shaft 24. The distal ends of adjacent spokes 22 are attached, such as via welding or adhesive or fasteners or the like, to circumferential bracket portions 26 so as together form a peripheral structure 28 of the rigid frame 20. The support base, such as the illustrated peripheral structure 28 of the rigid frame 20, provides a supportive structure for securing several masking devices with sufficient rigidity and strength to withstand the forces generated by the pressurized water spraying against the masking devices. The illustrated rigid frame 20 is configured to rotate in a generally horizontal plane, but it is contemplated that the rotation in other embodiments may alternatively occur in a vertical or tilted orientation. It is also contemplated that the shape and structure of the rigid frame may have various alternative configurations in additional embodiments of the paint removal apparatus.

Figure 4:
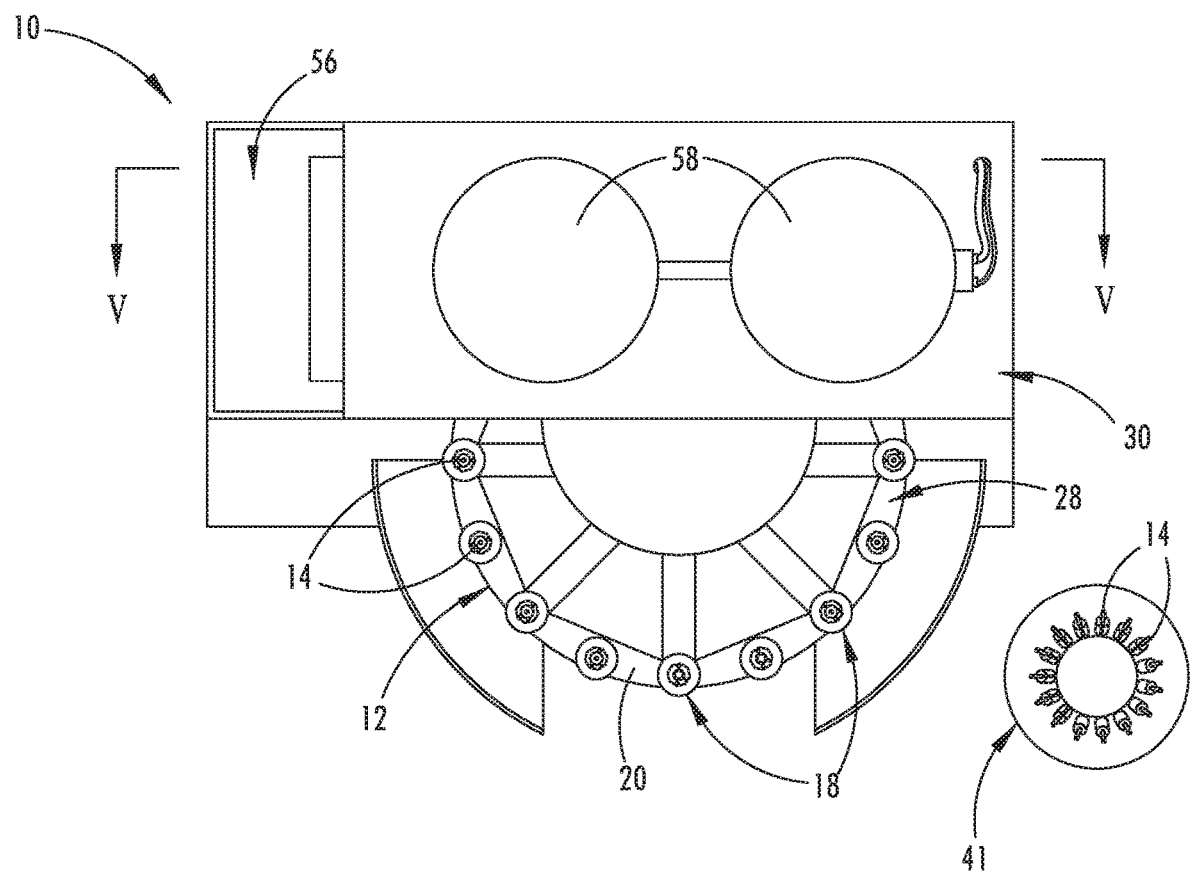
FIG. 4 is a top plan view of the paint removal apparatus shown in FIG. 1, illustrating a support base for the masking plugs being partially positioned outside a spray enclosure.
Figure 4A:
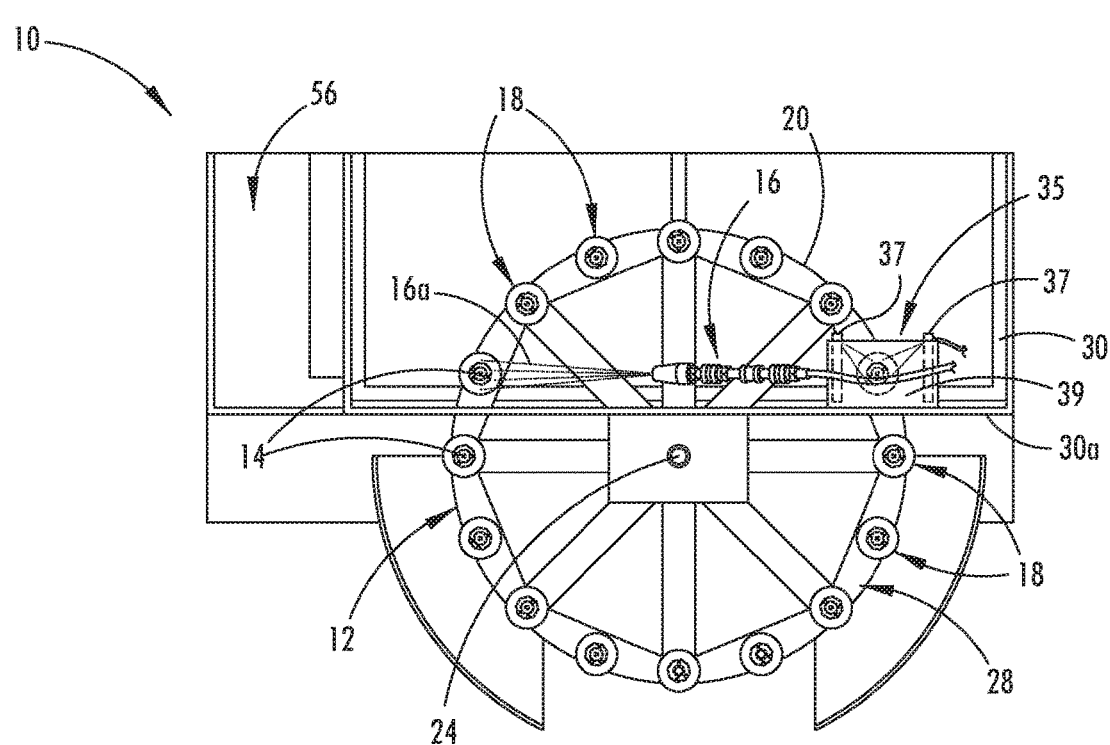
FIG. 4A is a top plan view of a cross section of the paint removal apparatus taken at line IVA-IVA shown in FIG. 3.

The engagement features 18 that supportively engage the masking devices 14 may be coupled with the rigid frame 20 at generally equally spaced locations around the peripheral structure 28, as shown in FIGS. 4 and 4A. The engagement features 18 are also each attached to the rigid frame 20 at a generally equal distance from the drive shaft 24 to define a circumference of the support base 12. Such generally equal circumferential and radial spacing allow the pressurized water to more consistently interact and clean each of the masking devices engaged at the engagement features 18. It is also contemplated that in additional embodiments that the engagement features may be spaced at different circumferential locations to interface with a different spray nozzle, such as to allow for a larger quantity of masking devices to be cleaned per revolution of the support base and/or to allow for different engagement features to be used for different types of masking devices or for different amounts of accumulated paint as these conditions may benefit from a differently configured spray nozzle.

The engagement features 18 may each be individually rotatable or pivotal relative to the rigid frame 20 of the support base 12, such as to allow the pressurized stream or streams of water to freely rotate or pivot the masking devices securely held at the engagement features 30. For example, as the rigid frame 20 rotates clockwise, such as shown in FIG. 4A, the portion of the masking plug 14 that first contacts the pressurized water stream 16a is located at one side of the rotational or pivot axis 18a of the corresponding engagement feature 18, which causes the masking plug 14 to rotate counterclockwise about the rotational or pivot axis. However, as the rigid frame 20 continues to rotate clockwise, the water stream 16a becomes aligned with the rotational axis 18a and is then located at the opposing side of the rotational axis 18a, which then causes the masking plug 14 to slow its counterclockwise rotation and may cause it to rotate clockwise about the rotational axis 18a. Such rotation or pivoting of the masking devices allows the water stream to clean circumferentially around the multiple surfaces of the masking devices. The rotational or pivot axis 18a of each of the engagement features 18 may be substantially parallel to or aligned with the central axis 20a of the rigid frame 20, such as shown in FIGS. 8 and 9.

Figure 2:
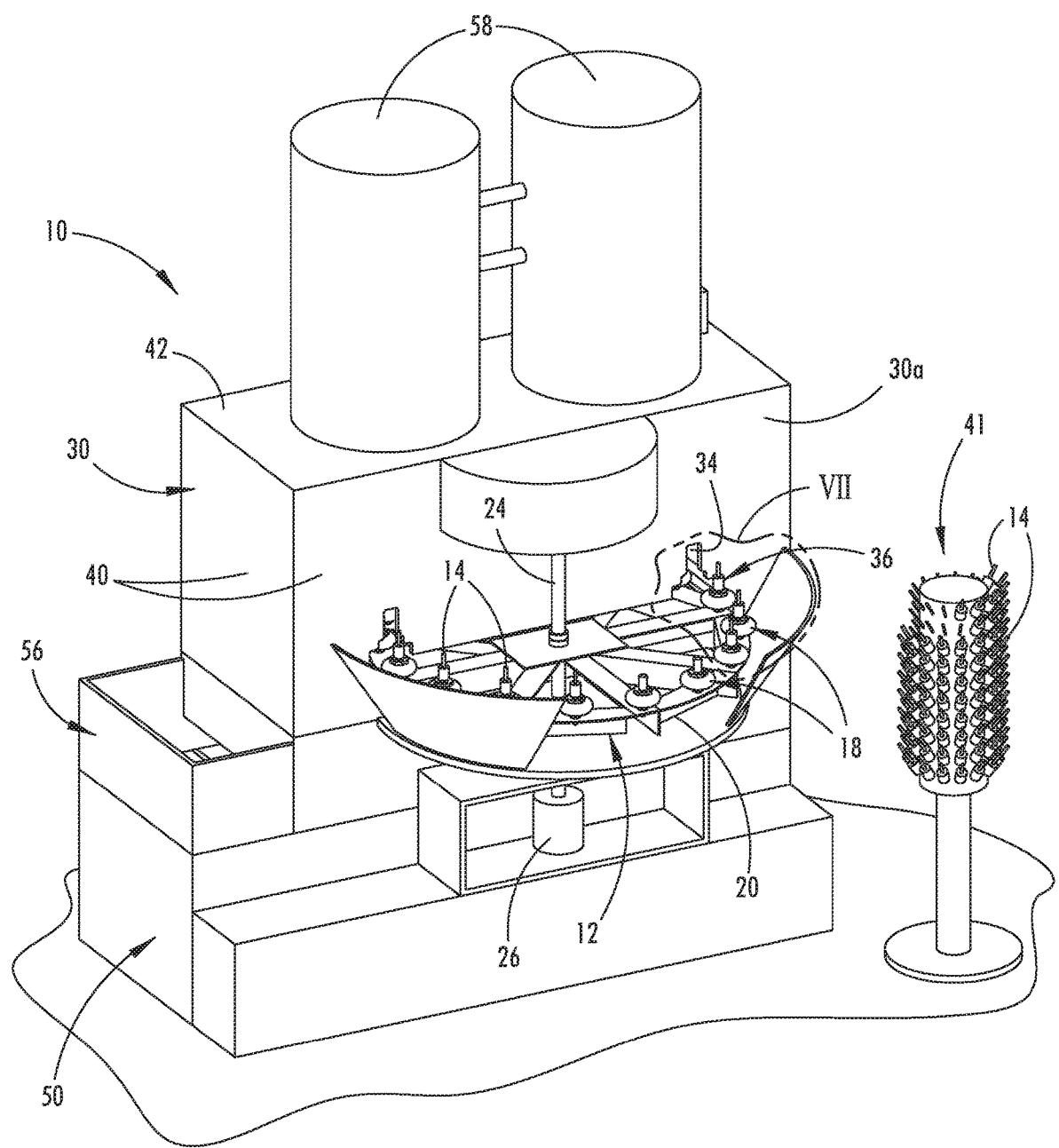
FIG. 2 is another upper perspective view of the paint removal apparatus shown in FIG. 1.
Figure 3:
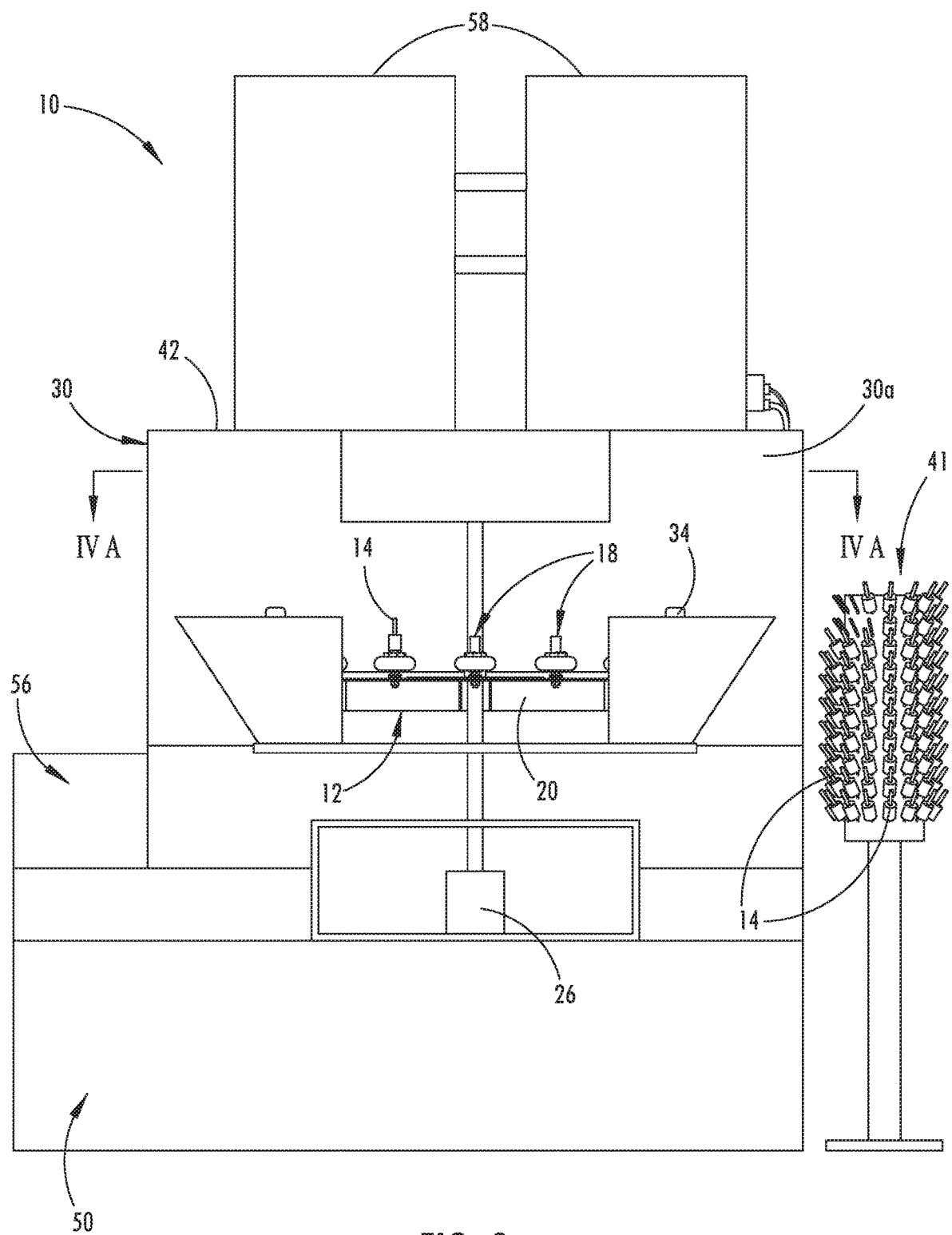
FIG. 3 is a front elevational view of the paint removal apparatus shown in FIG. 1.

With at least one of the masking devices engaged to an engagement feature 18, the support base 12 may be movable to position the masking device to be cleaned in the path of the pressurized stream of water. As shown in FIGS. 1-3, the support base 12 may be driven in rotation by the generally vertical drive shaft 24, defining the generally vertical central axis 20a of the rigid frame 20. The illustrated drive shaft 24 is driven or operated by a drive motor 26 operably coupled at a lower end of the drive shaft 24. The drive motor 26 may have a gear box or other device to reduce or otherwise control the rotational speed of the drive shaft 24 and the support base 12. The support base 12 may be driven in rotation at a generally constant speed by the drive motor 26 to rotate the masking devices to be cleaned in a direction opposing the pressurized stream of water, whereby the stream of water may be substantially tangential to the circumference defined by the engagement features 18. By driving the rotation of support base 12 against the pressurized stream of water, the cleaned masking devices move away from the debris being sprayed off of the masking devices being cleaned. Also, the rotational force of the support base 12 against the direction of the water stream increases the relative force of the water contacting the masking devices. The illustrated drive motor 26 is preferably an electric motor that is configured with a gear box to rotate at approximately 30-40 seconds per revolution, and more preferably about 32 seconds per revolution. However, it is contemplated that various other types of motors or rotational speeds may be desirable for alternative masking devices and/or the quantity and/or type of water spray nozzles.

Figure 11:
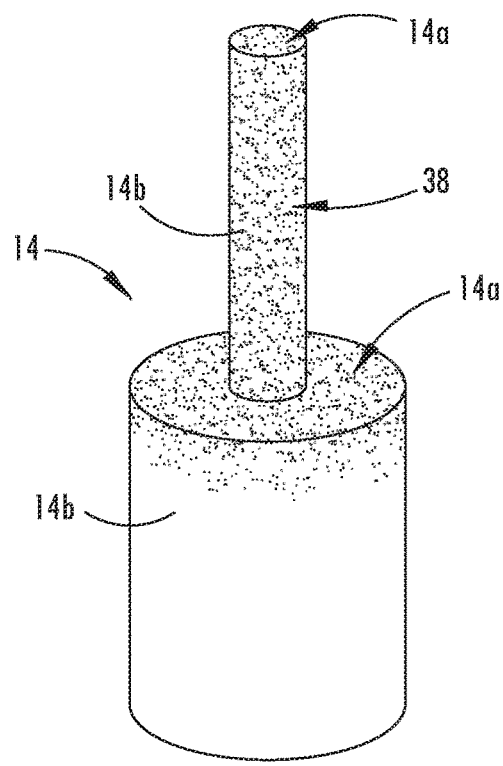
FIG. 11 is an upper perspective view of a dirty masking plug having paint particles attached to the exterior surface.

As shown in FIGS. 4A-5A, the spray nozzle 16 is supported by a rigid spray shaft 28 that may be attached to and/or extend through an enclosure 30 that generally surrounds a cleaning area of the illustrated paint removal apparatus 10. The enclosure 30 may be a shield or cover or chamber or the like and may be provided to surround the water nozzle 16 and at least some of the masking devices engaged with the support base 12. A water supply pipe or hose 32 may lead into the enclosure 30 and connect with the rigid spray shaft 28 to supply pressurized water to the spray nozzle 16. The rigid spray shaft 28 may be fixed relative to the enclosure 30 to position the nozzle 16 at the desired angle for the respective type and shape of masking plug and support base. As shown, the masking device is a plug 14 that has an upper surface 14a that collects paint (FIG. 11), such that the nozzle 16 may be angled downward toward the upper surfaces 14a and circumferential side surfaces 14b of the plugs 14 that collect cured paint to direct the water stream at the dirty exterior surfaces. It is also contemplated that one or more additional nozzles may be provided in an alternative embodiment of the paint removal apparatus, such that the nozzles could be positioned with one nozzle inside the circumference of the support base and another nozzle outside the circumference, so as to provide two different contact angles of water streams hitting the painted surfaces of the masking device. It is conceivable that multiple water nozzles and support bases may be provided within the enclosure, such as to increase the cleaning capacity. Optionally, for example, an additional rotating support base may be provided at the opposing sidewall of the illustrated enclosure, where the spokes of the two support bases could mesh together to increase the number of plugs that pass through the pressurized water stream (or streams) without providing additional spray nozzles.

The paint removal apparatus 10 may include a spray barrier, such as at least a front wall portion 30a of the illustrated enclosure 30 as shown in FIG. 4A, which is disposed between the spray nozzle 16 and a portion of the support base 12 that is configured for unloading cleaned masking devices from at least one of the engagement features 18. The spray barrier, such as the illustrated front wall portion 30a show in FIG. 5, may include at least one opening 34 that allows the paint-covered masking devices 14 to enter the cleaning area and for the cleaned masking devices 14 to exit. The opening 34 may thereby allow the support base 12 to partially enter the cleaning or spray enclosure area that may be generally surrounded by the enclosure 30. The opening 34 in the spray barrier may be generally shaped to conform to the profile of the portion of the support base 12 and corresponding masking device that intersects with the spray barrier, as shown disposed in the front wall portion 30a illustrated in FIG. 5. Accordingly, the opening may be alternatively shaped to conform to a differently shaped support base and/or masking device of an additional embodiment of the paint removal device.

As shown in FIG. 4A, prior to the masking devices exiting the opening 34 out the spray enclosure 30, the interior of the enclosure 30 may include a secondary spray station 35 that provides smaller spray nozzles 37 that clean additional debris off of the masking device immediately before it leaves the spray enclosure 30. The water spray provided by the nozzles 37 at this secondary spray station 35 may have a lower spray velocity than the primary nozzle 16, such that the secondary spray station 35 may function primarily to rinse the masking devices of debris that may have landed on the masking device in the spray enclosure or debris that is partially removed. As also shown in FIGS. 4A-5A, the secondary spray station 35 has a secondary enclosure 39 that acts as a tunnel leading out of the spray enclosure 30, whereby the secondary enclosure 39 protects the exiting and secondarily rinsed masking devices from accumulating airborne debris that has been removed from masking devices and is circulating in the spray turbulence generated from the primary nozzle 16.

Figure 12:
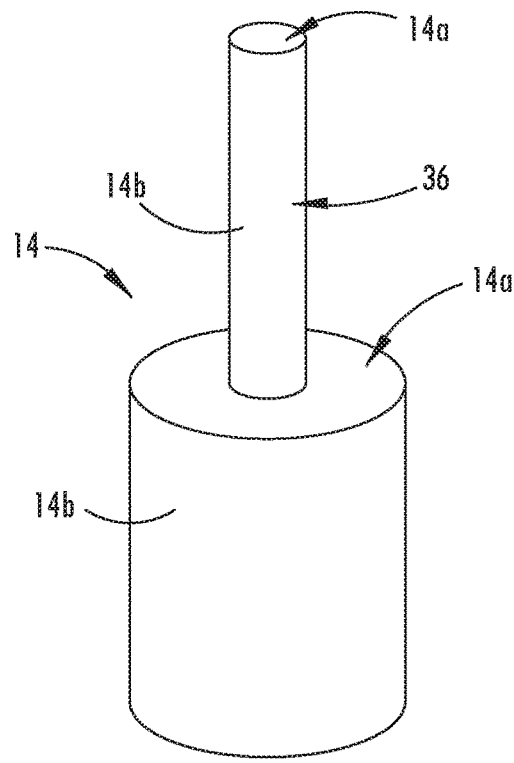
FIG. 12 is an upper perspective view of a clean masking plug.

The drive shaft 24 may be located outside the enclosure 30, such as shown in FIG. 2, where the drive shaft is not exposed to the water stream during operation and rotation of the support base 12. An exposed portion of the support base 12 also extends outside the opening 34 in the enclosure 30 to allow for cleaned plugs 14, having the exterior surfaces generally free of paint 36 (FIGS. 2, 7, and 12), to be removed from the engagement features 18 and painted-covered plugs, having the exterior surfaces generally covered with paint particles 38 (FIGS. 1, 6, and 11), to be loaded onto the open engagement features 18 of the exterior or exposed portion of the support base 12. This removal and replacement provides a generally continuous cleaning of masking devices. It is conceivable that a user may manually remove and replace these masking devices from the exposed portion of the support base and/or this process may be automated with ejector pins and/or a loading device, such as a robotic arm or other such loading devices.

The front wall portion 30a of the enclosure 30 may protrude outward and include a guard structure 39, such as shown in FIGS. 1 and 2, for a user to manually operate the loading and unloaded of the masking devices in a safe manner. The guard structure 39 shown in FIG. 1 is open from the top to allow the user to visually inspect the plugs as they exit the enclosure 30 and provides a central opening 39a that allows the user to easily reach into the guard structure for removing and replacing the plugs 14 in an area away from the opening 34 in the enclosure 30 that could interfere with the access to the plugs 14. As the user removes the plugs 14, the user may also be placed or hung at a drying station 41. As shown in FIGS. 1-4, the cleaned plugs may be held in the drying station 41 after cleaning for drying residual water and inspection before being reused in future paint masking applications. Such a drying station may comprise a rack or hanger with locations to load and hang each cleaned plug, such as a pole with hooks for a select quantity of plugs (such as 100 plugs) thereby simplifying and confirming the count of cleaned plugs generated by the cleaning process.

Figure 5:
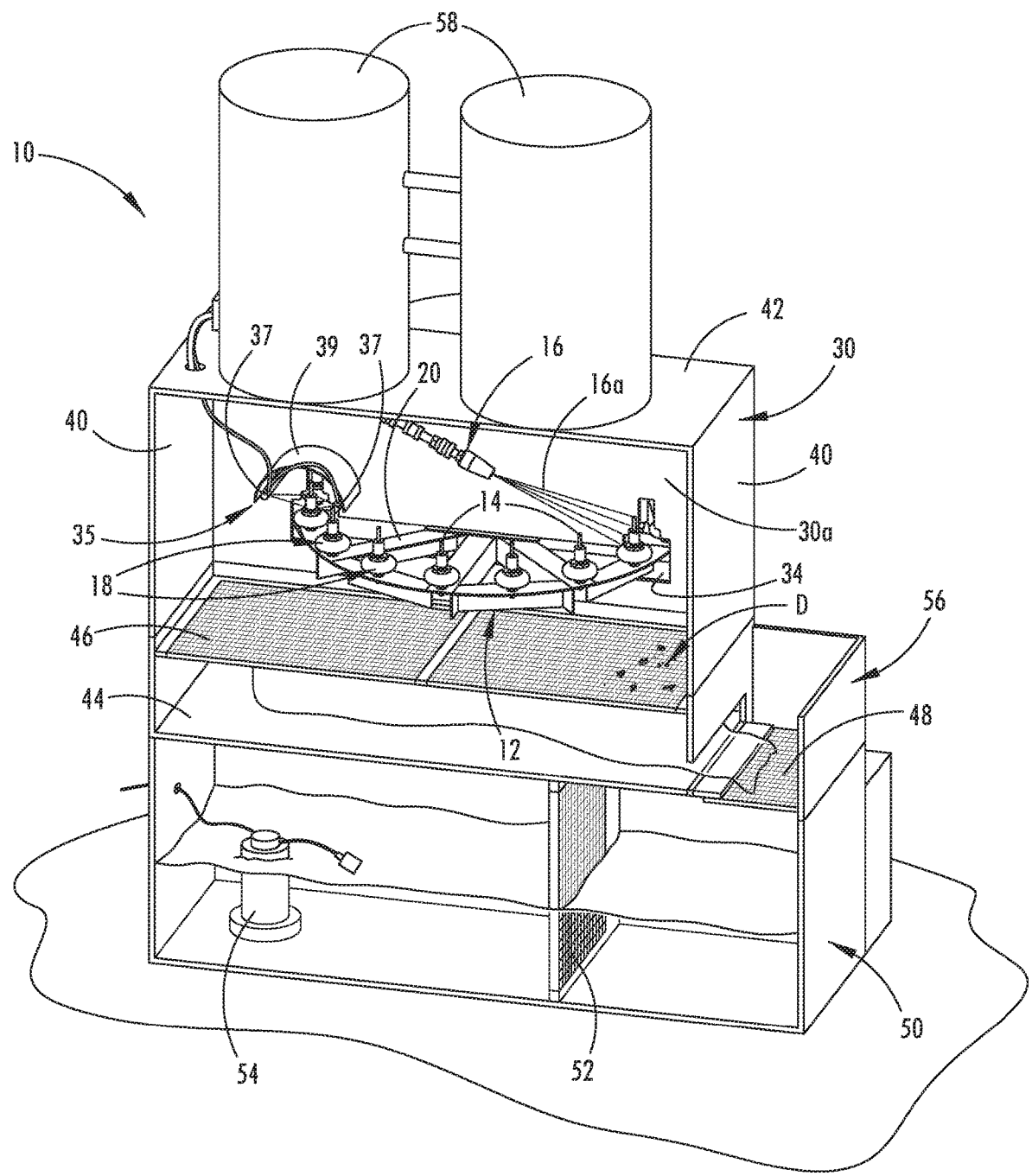
FIG. 5 is an upper perspective view of a cross section of the paint removal apparatus taken at line V-V shown in FIG. 4.
Figure 5A:
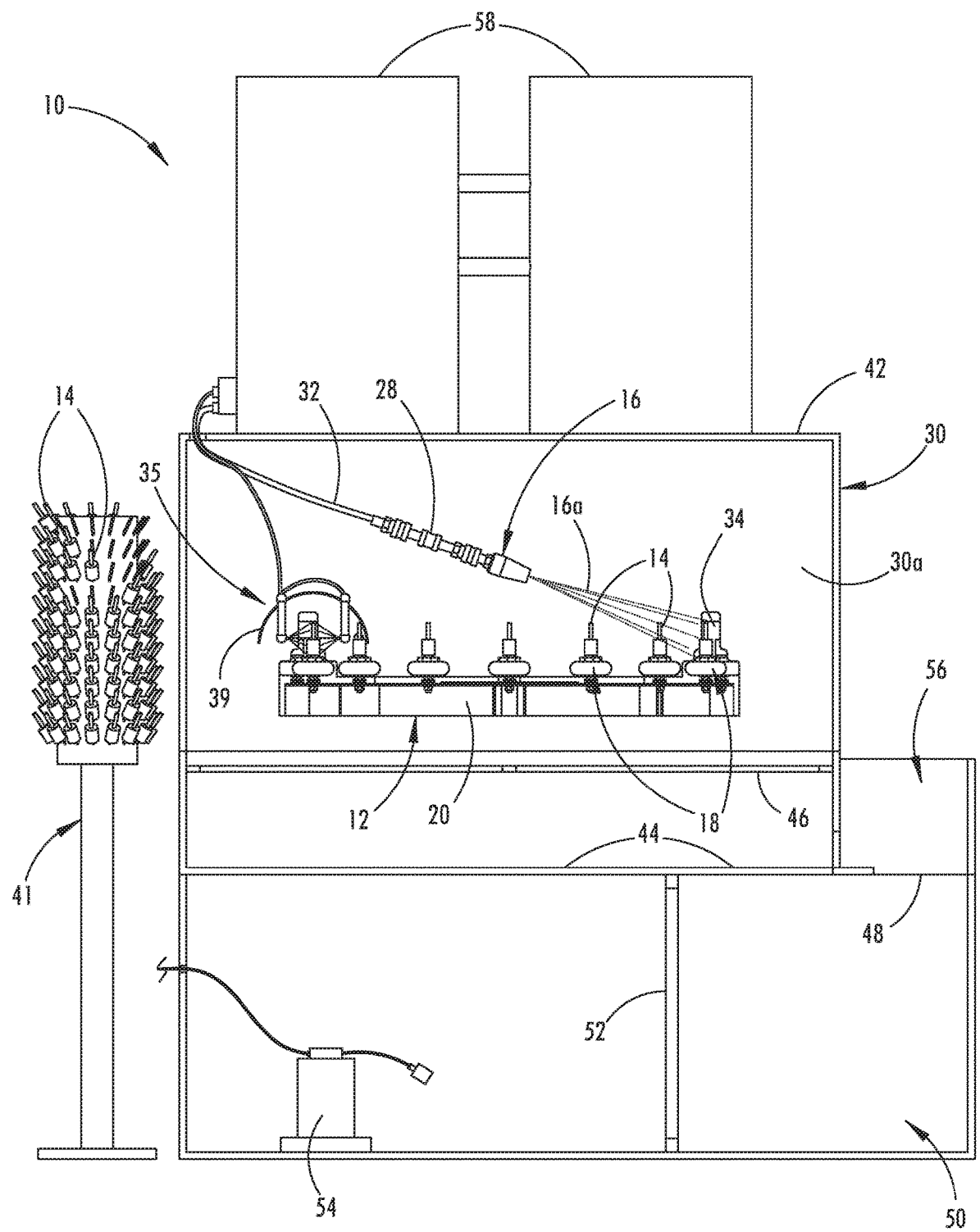
FIG. 5A is a rear elevational view of the paint removal apparatus shown in the cross-sectional view of FIG. 5.
Figure 6:
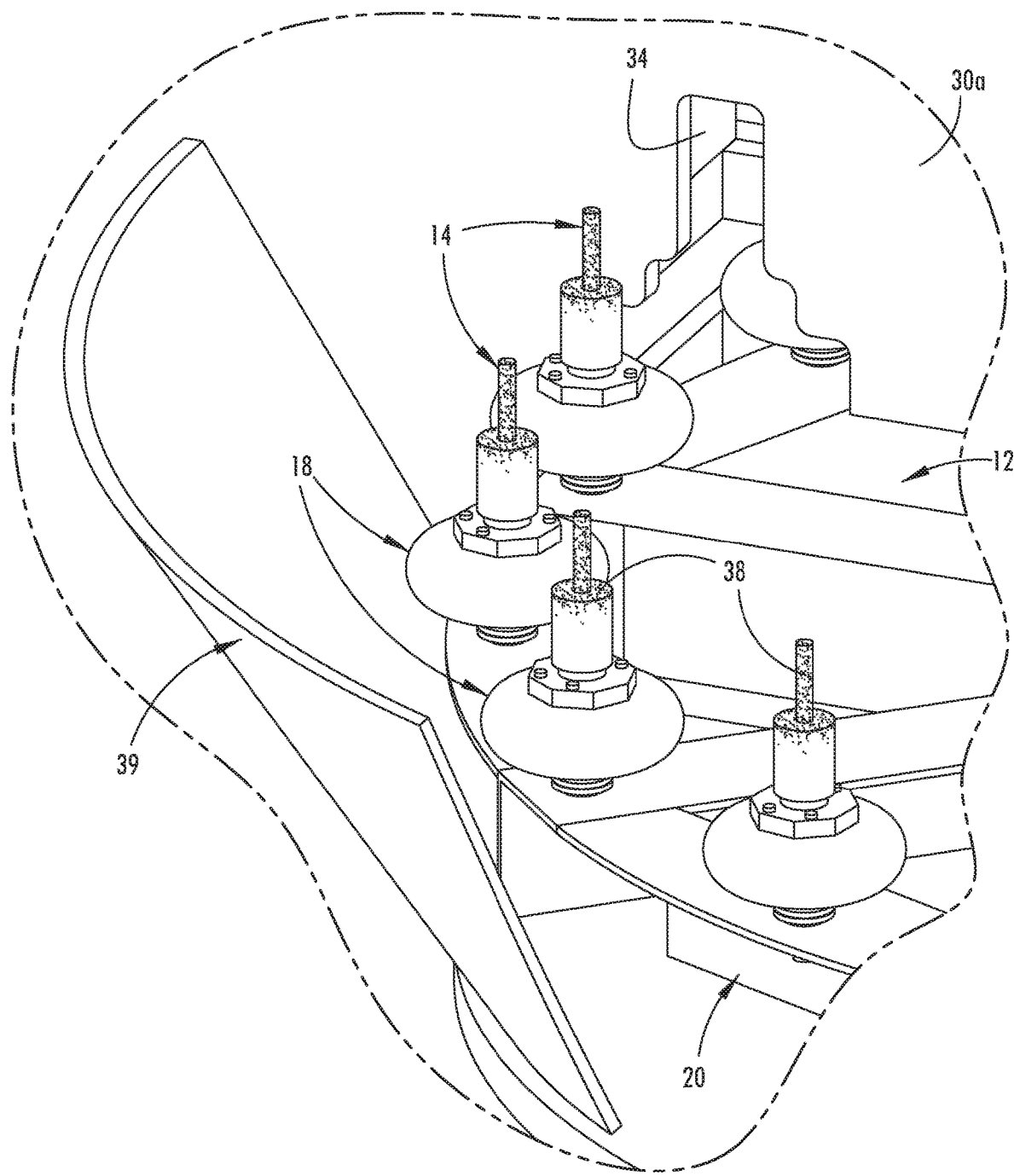
FIG. 6 is an enlarged upper perspective view of the support base carrying paint-covered masking plugs into the spray enclosure, taken from section VI shown in FIG. 1.
Figure 7:
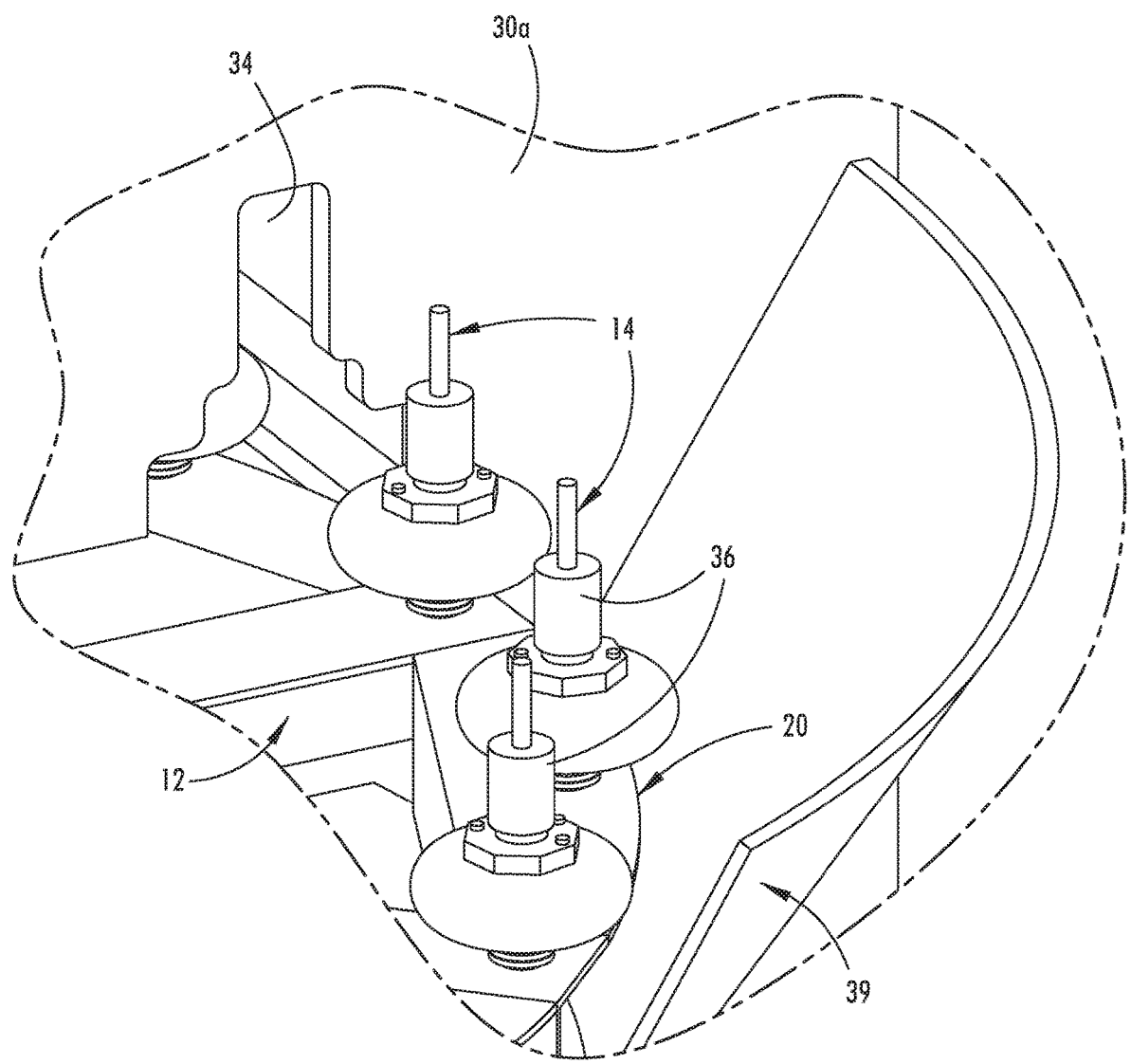
FIG. 7 is an enlarged upper perspective view of the support base carrying clean masking plugs out of the spray enclosure, taken from section VII shown in FIG. 2.

Referring again to FIGS. 1, 2, and 5, the illustrated enclosure 30 has a generally rectangular shape with four sidewalls 40 that surround the nozzle 16 and a top cover or upper portion 42 spanning over and connecting with the sidewalls 40. As shown in FIG. 5, the enclosure 30 also includes a floor or bottom 44 that is substantially flat and interconnects with the sidewalls 40 to enclose and define the cleaning or water spray enclosure area. An initial screen or filter 46 may be provided between the support base 12 and the floor or bottom 44 to collect debris D, such as paint flakes or particles that are stripped from the masking devices with the high pressure water spray during the cleaning process. The bottom 44 of the enclosure 30 may be sloped to allow water to drain from the cleaning or spray enclosure area toward an intermediate screen or filter 48 that leads to a water basin or lower reservoir 50. As shown in FIG. 5, the lower reservoir 50 may include a final screen or filter 52 that divides the lower reservoir 50, such that the water also passes through the final screen or filter 52 as it is drawn to a water pump 54 that circulates the water back up toward the water nozzles 16. Thus, the water sprayed from the nozzles 16 may be filtered through a series of filters or screens, such as the filters 46, 48, and 52 shown in FIG. 5, and recirculated to the water nozzles 16 to provide a closed loop of water. Such a filter may comprise a mesh material, woven polymer substrate, an open-celled foam filter, textile filter, or other generally known filter substrate.

As shown in FIG. 5, the enclosure 30 is connected to a filter housing 56 that is attached at a lower portion of the enclosure 18, along the sidewall 40 that is arranged to receive the water spray 16a from the water nozzles 16. Accordingly, the pressurized streams of water direct and urge the water that collects on the bottom 44 of the spray enclosure area to flow toward and through the filter 48 attached at the bottom of the filter housing 56. Although shown in a rectangular shape, it is conceivable that the enclosure, filter housing, and reservoir may be various other shapes, such as a cylindrical or domed shape enclosure, and the bottom of each may also alternatively be sloped to direct the flow of the water in the desired direction.

Once the water has filter from the spray enclosure 30, through the filters, and to the sump pump 54, the pump 54 may then pump the water from the lower reservoir 50 to an elevated storage tank or tanks 58. The illustrated storage tanks 58 are supported at the top 42 of the enclosure 30. The water held in the storage tanks 58 is then gravity fed to a pressurizing device, such as a water pump driven by a motor, such as gas-powered or electric motor, that delivers the pressurized water to the spray nozzles 16, such as via the high-pressure hoses 32 and the spray shaft 28. It is also contemplated that the storage tanks may be located at an alternative elevated location from the illustrated embodiment.

Figures 10, 10A:
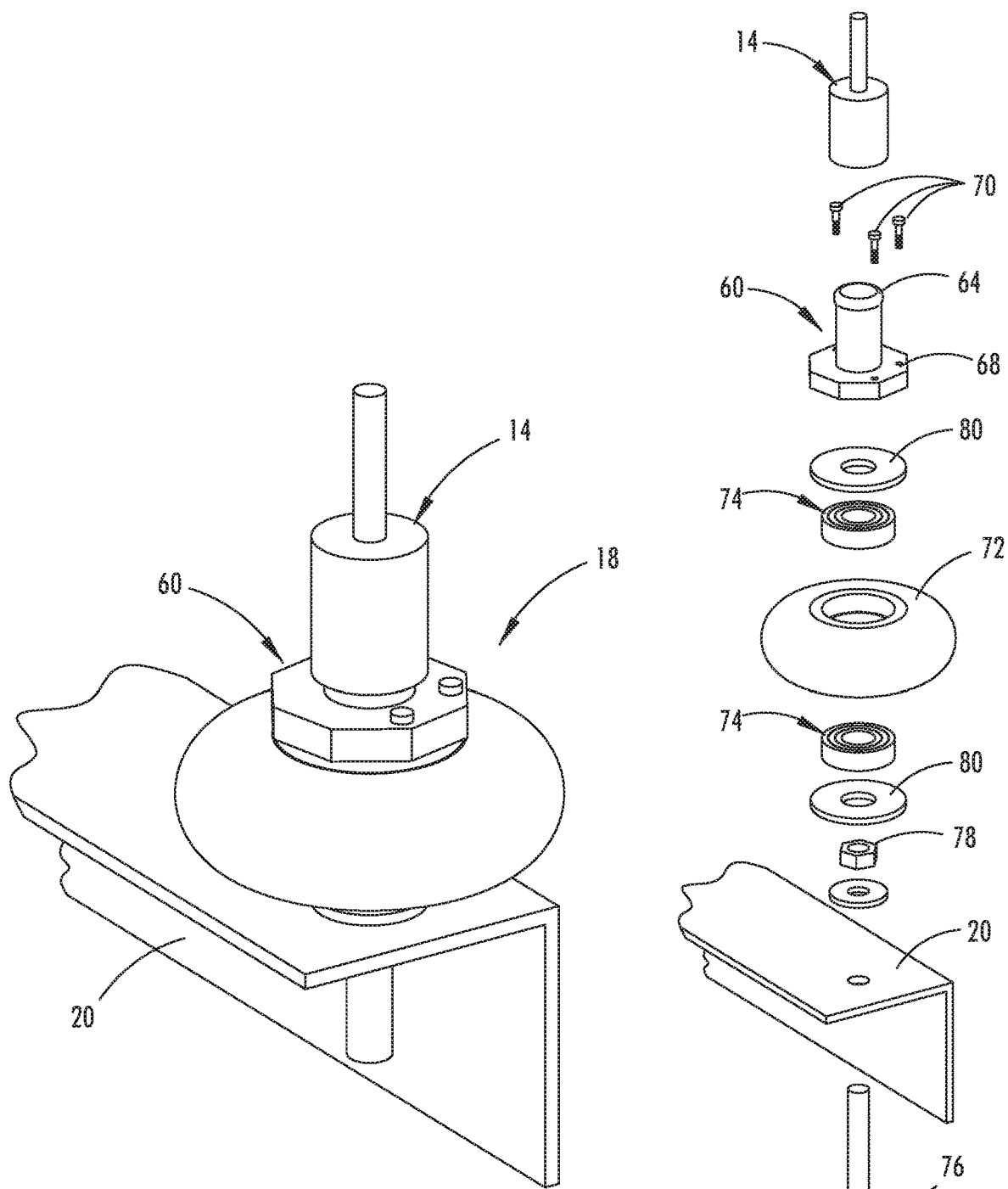
FIG. 10 is an upper perspective view of an engagement feature of the support base that is supporting a masking plug.
FIG. 10A is an exploded upper perspective view of the engagement feature and masking plug shown in FIG. 10.
Figure 11A:
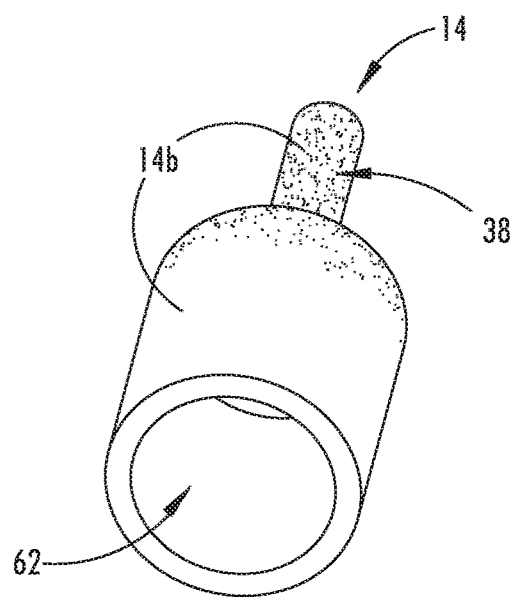
FIG. 11A is a lower perspective view of the dirty masking plug shown in FIG. 11.
Figure 12A:
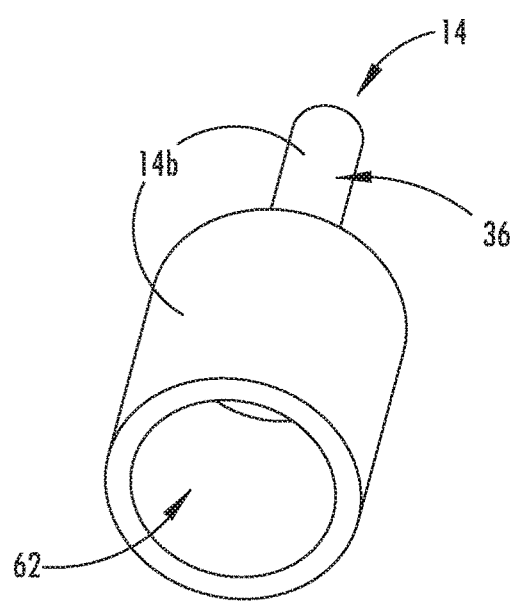
FIG. 12A is a lower perspective view of the clean masking plug shown in FIG. 12.

With reference to FIGS. 10 and 10A, the engagement feature 18 has an upper portion 60 shaped to securely hold the masking plug 14 by engaging an interior surface of a lower cavity 62 of the plug 14, such as shown in FIGS. 11A and 12A. The illustrated upper portion 60 includes a generally cylindrical piece with an enlarged and rounded upper edge 64 that is configured to provide a friction fit with the interior surface of the lower cavity 62. The plugs 14 are typically made of a silicon material that provides some elasticity and resiliency, such that the plugs may be forced downward onto the tapered and rounded upper portion 60 to provide the secure connection between the plug and engagement feature 18.

To allow for the free rotation of the engaged masking devices, the upper portion 60 of the engagement feature 18 may be rotatably coupled with the rigid frame 20 of the support base 12 via a lower portion 66 of the engagement feature 18. As shown in FIG. 10A, the cylindrical piece of the upper portion 60 has a lower flange 68 that attaches with fasteners 70 to a bearing enclosure or retainer 72 that houses and engages bearings 74 between the cylindrical piece and a threaded shaft 76 that attaches (such as via nuts 78) to the rigid frame 20 of the support base 12. The bearing retainer 72 is separated from the rigid frame 20 by a washer 80. Thus, the lower portion 66 allows the upper portion 60 of the engagement feature 18 to freely rotate relative to the support base 12. It is contemplated that other rotatable connections may alternatively be provided between the engagement feature 18 and the support base 12, such as to permit the desired rotation of the masking device.

Figure 13:
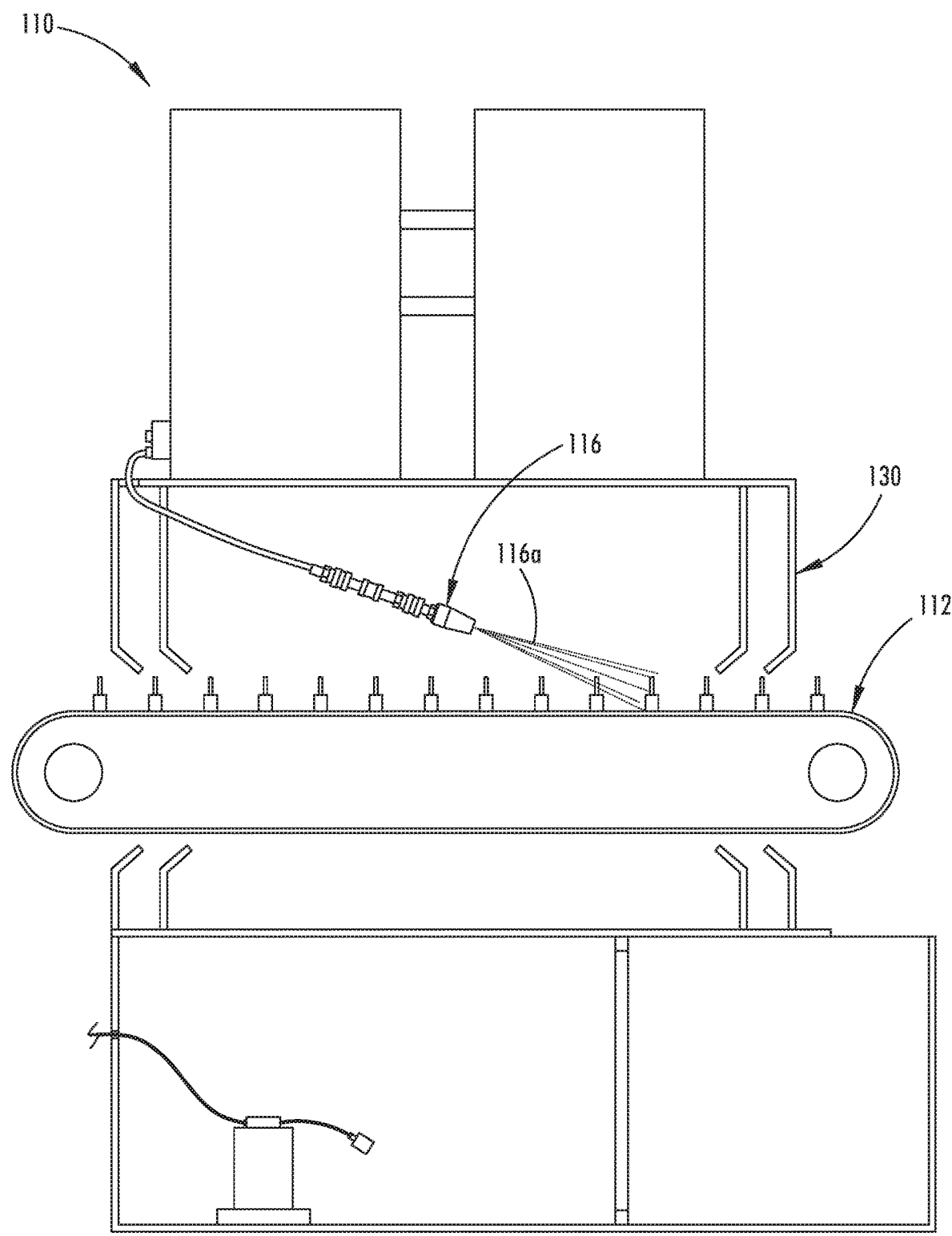
FIG. 13 is a side elevational view of an additional embodiment of a paint removal apparatus having a conveyor system.

An additional embodiment of the paint removal apparatus 110 is shown in FIG. 13, which has a support base 112 shown as a conveyor. In this embodiment, the conveyor 112 may be loaded at one end of the washing enclosure 130 and the washed plugs exit the opposing end of the washing enclosure 130, and simply fall off of the conveyor 112, such as into a clean plug container for drying. Again in the additional embodiment of the paint removal apparatus 110 shown in FIG. 13, the nozzles 116 are pointed toward the entrance end of the washing enclosure 130 to prevent removed paint debris from contaminating clean plugs. The illustrated paint removal apparatus 110 also has air ventilation vestibules provided at opposing ends of the washing enclosure 130 to filter and vent air generated by spray nozzles.

With respect to the associated method for cleaning paint from the masking devices, the masking plugs are first positioned or loaded onto (or into) a support base that rotates or otherwise moves within an enclosure of a paint removal apparatus. A pressurized stream of water is sprayed from a water nozzle that is housed or at least partially contained in the enclosure. The pressurized stream of water is directed at the support base in the location where the plugs are held or otherwise contained by the support base. The support base is rotated, such as via a drive motor, to position a plug of the plurality of masking plugs in the pressurized stream of water to remove paint from the plug without damaging the plug. The support base may be driven in rotation at a generally constant speed and in a rotational direction opposing in the pressurized stream of water, such that paint debris cleaned from the plugs is prevented from spraying onto plugs that have been cleaned. The support base may also partially extend from the enclosure for removing cleaned plugs and loading painted plugs, thereby providing a continuous cleaning operation.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A paint removal apparatus for cleaning paint from masking devices, said paint removal apparatus comprising:
   a support base having a plurality of engagement features that are each configured to securely engage at least one masking device;
   a spray nozzle aimed in a fixed direction toward the support base and configured for spraying a pressurized stream of water at a desired velocity that removes paint from an exterior surface of at least one of the masking devices engaged at the support base;
   wherein the support base is configured to successively move the masking devices engaged at the engagement features into the pressurized stream of water;
   wherein the support base comprises a rigid frame that is configured to rotate relative to the spray nozzle about a central axis of the rigid frame; and
   wherein the rigid frame is configured to rotate in a direction opposing the pressurized stream of water generated by the spray nozzle.

2. The paint removal apparatus of claim 1, wherein each of the plurality of engagement features are coupled with the rigid frame and configured to rotate relative to the rigid frame.

3. The paint removal apparatus of claim 2, wherein a rotational axis of at least one of the plurality of engagement features is substantially parallel to the central axis of the rigid frame.

4. The paint removal apparatus of claim 1, wherein, after paint is cleaned from one of masking devices, the engagement feature engaging the cleaned masking device is configured to allow for removal of the cleaned masking device from the engagement feature and for engaging another masking device for cleaning.

5. The paint removal apparatus of claim 1, further comprising:
   a spray barrier disposed between the spray nozzle and a portion of the support base that is configured for unloading cleaned masking devices from at least one of the engagement features.

6. The paint removal apparatus of claim 5, wherein the spray barrier prevents water from the spray nozzle from exiting a cleaning area at least partially enclosed by the spray barrier.

7. The paint removal apparatus of claim 6, wherein the support base is configured to continuously rotate for successively removing cleaned masking devices exiting the cleaning area and loading painted masking devices onto a least one of the engagement feature to reenter the cleaning area.

8. The paint removal apparatus of claim 1, wherein the plurality of engagement features each include a fixed portion that is fixedly attached to a rigid frame of the support base, and wherein a rotatable portion of each of the plurality of engagement features rotates relative to the fixed portion and is configured to engage at least one masking devices.

9. The paint removal apparatus of claim 8, wherein the rotatable portion of each of the plurality of engagement features is configured to rotate from the pressurized stream of water contacting an exterior surface of the engaged masking device to expose the circumference of the exterior surface of the engaged masking device to the pressurized stream of water.

10. The paint removal apparatus of claim 1, wherein a water basin is disposed below the support base for accumulating water that is sprayed from the spray nozzle, and wherein a filter is disposed between the water basin and a pump that draws water in the water basin through the filter to filter the water before recirculating the water to the spray nozzle.

11. A paint removal apparatus for cleaning paint from masking devices, said paint removal apparatus comprising:
   a support base having a plurality of engagement features that are each configured to securely engage at least one masking device;
   a spray nozzle directed toward the support base and configured for spraying a pressurized stream of water that removes paint from a masking plug engaged at the support base;
   a spray barrier disposed between the spray nozzle and a portion of the support base that is configured for loading painted masking devices onto at least one of the plurality of engagement features; and
   wherein the support base is configured to continuously move for successively removing cleaned masking devices and loading painted masking devices onto a least one of the engagement features.

12. The paint removal apparatus of claim 11, wherein the spray barrier prevents water from the spray nozzle from exiting a cleaning area at least partially enclosed by the spray barrier, and wherein the support base is configured to continuously rotate for successively removing cleaned masking devices exiting the cleaning area and loading painted masking devices onto at least one of the engagement features to reenter the cleaning area.

13. The paint removal apparatus of claim 11, wherein the support base is configured to successively move the masking devices engaged at the support base into the pressurized stream of water generated by the spray nozzle, and wherein the rigid frame is coupled with a drive motor that is configured to rotate the rigid frame in a direction opposing a direction of the pressurized stream of water.

14. The paint removal apparatus of claim 13, wherein the support base comprises a vertical axis of rotation, and wherein the plurality of engagement features are disposed at a circumference of the support base.

15. A paint removal apparatus for cleaning paint from masking devices, said paint removal apparatus comprising:
   a support base having a plurality of engagement features that are each configured to securely engage at least one masking device;
   a spray nozzle aimed in a fixed direction toward the support base and configured for spraying a pressurized stream of water at a desired velocity that removes paint from an exterior surface of at least one of the masking devices engaged at the support base; and
   a spray barrier disposed between the spray nozzle and a portion of the support base that is configured for unloading cleaned masking devices from at least one of the engagement features;
   wherein the support base is configured to successively move the masking devices engaged at the engagement features into the pressurized stream of water.

16. The paint removal apparatus of claim 15, wherein each of the plurality of engagement features are coupled with the rigid frame and configured to rotate relative to the rigid frame.

17. The paint removal apparatus of claim 15, wherein a rotational axis of at least one of the plurality of engagement features is substantially parallel to the central axis of the rigid frame.

18. The paint removal apparatus of claim 15, wherein the spray barrier prevents water from the spray nozzle from exiting a cleaning area at least partially enclosed by the spray barrier.

19. The paint removal apparatus of claim 18, wherein the support base is configured to continuously rotate for successively removing cleaned masking devices exiting the cleaning area and loading painted masking devices onto a least one of the engagement feature to reenter the cleaning area.

20. The paint removal apparatus of claim 15, wherein a water basin is disposed below the support base for accumulating water that is sprayed from the spray nozzle, and wherein a filter is disposed between the water basin and a pump that draws water in the water basin through the filter to filter the water before recirculating the water to the spray nozzle.

\* \* \* \* \*